United States Patent [19]

Sultan

[11] 4,390,886

[45] Jun. 28, 1983

[54] INK JET PRINTING MACHINE

[75] Inventor: S. Bertil Sultan, Carrollton, Tex.

[73] Assignee: Xerox Corporation, Stamford, Conn.

[21] Appl. No.: 305,583

[22] Filed: Sep. 25, 1981

[51] Int. Cl.[3] .............................................. G01D 15/18

[52] U.S. Cl. .................................. 346/140 R; 346/75

[58] Field of Search ............... 346/75, 140 IJ, 140 PD

[56] References Cited

U.S. PATENT DOCUMENTS 3,693,179 9/1972 Skala ........................ 346/140 PD X 3,946,398 3/1976 Kyser et al. ............. 346/140 PD X 4,032,929 6/1977 Fischbeck et al. ........... 346/140 PD 4,057,807 11/1977 Fischbeck et al. ........... 346/140 PD 4,243,995 1/1981 Wright et al. ................ 346/140 PD 4,303,927 12/1981 Tsao ...................................... 346/75

4,326,206 4/1982 Raschke ........................ 346/140 PD

*Primary Examiner*—George H. Miller, Jr.

[57] ABSTRACT

An ink jet printing machine in which adjacent nozzles are isolated from one another to prevent energization of a nozzle other than a selected nozzle.

6 Claims, 3 Drawing Figures

INK JET PRINTING MACHINE

This invention relates generally to ink jet printing, and more particularly concerns isolating adjacent ink jet nozzles from one another to prevent interaction therebetween.

Generally, an ink jet printing machine has an array of small nozzles with each nozzle having a chamber containing ink associated therewith. Upon excitation, an electromechanical transducer varies the volume of the chamber producing a temporary increase in pressure forcing a droplet of ink to be ejected from the corresponding nozzle. These individual droplets of ink are sprayed onto a copy sheet. One column of vertical drops is referred to as a scan. If, in forming a character, a particular space in a scan is to be left blank, the transducer associated with the appropriate nozzle remains deenergized and a droplet of ink is not ejected from the nozzle. Thus, drops of ink are deposited in appropriate positions on the copy sheet to form the desired character. Ink jet printing machines of this type are described in U.S. Pat. No. 3,683,212 issued to Zoltan in 1972; U.S. Pat. No. 3,747,120 issued to Stemme in 1973; U.S. Pat. No. 3,832,579 issued to Arndt in 1974; and U.S. Pat. No. 3,871,004 issued to Rittberg in 1975.

One of the problems in a printing machine of this type is excitation of the transducer associated with a selected nozzle frequently introduces cross-coupling between adjacent nozzles. Thus, not only may the desired nozzle be excited, but other nozzles adjacent thereto also may be excited.

Various approaches have been devised to improve ink jet printing, the following disclosures appear to be relevant:

U.S. Pat. No. 4,032,929
Patentee: Fischbeck et al.
Issued: June 28, 1977

U.S. Pat. No. 4,057,807
Patentee: Fischbeck et al.
Issued: Nov. 8, 1977

U.S. Pat. No. 4,243,995
Patentee: Wright et al.
Issued: Jan. 6, 1981

The pertinent portions of the foregoing disclosures may be briefly summarized as follows:

Fischbeck et al. ('929) discloses a multiple nozzle unit having an ink supply chamber. A piezoelectric layer is excited to deform or decrease the volume of the respective chamber to cause a droplet of ink to be ejected from the nozzle.

Fischbeck et al. ('807) describes an ink jet assembly in which excitation of an electromagnet deforms a diaphram to decrease the volume of an ink chamber. Decreasing the volume of the chamber causes ink to be ejected from a nozzle in communication therewith.

Wright et al. describes an ink jet recording system in which a piezoelectric transducer is positioned partially in the ink channel. The piezoelectric transducer expands when excited acting like a piston to eject ink from the nozzle.

In accordance with the features of the present invention, there is provided an ink jet printing machine including an array of nozzles with means for storing a supply of writing fluid for each nozzle. Means are provided for energizing selected nozzles of the array of nozzles to eject spaced droplets of writing fluid therefrom. Means isolate the nozzles from one another to prevent interaction between the nozzles from energizing nozzles other than the selected nozzles of the array of nozzles.

Other aspects of the present invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
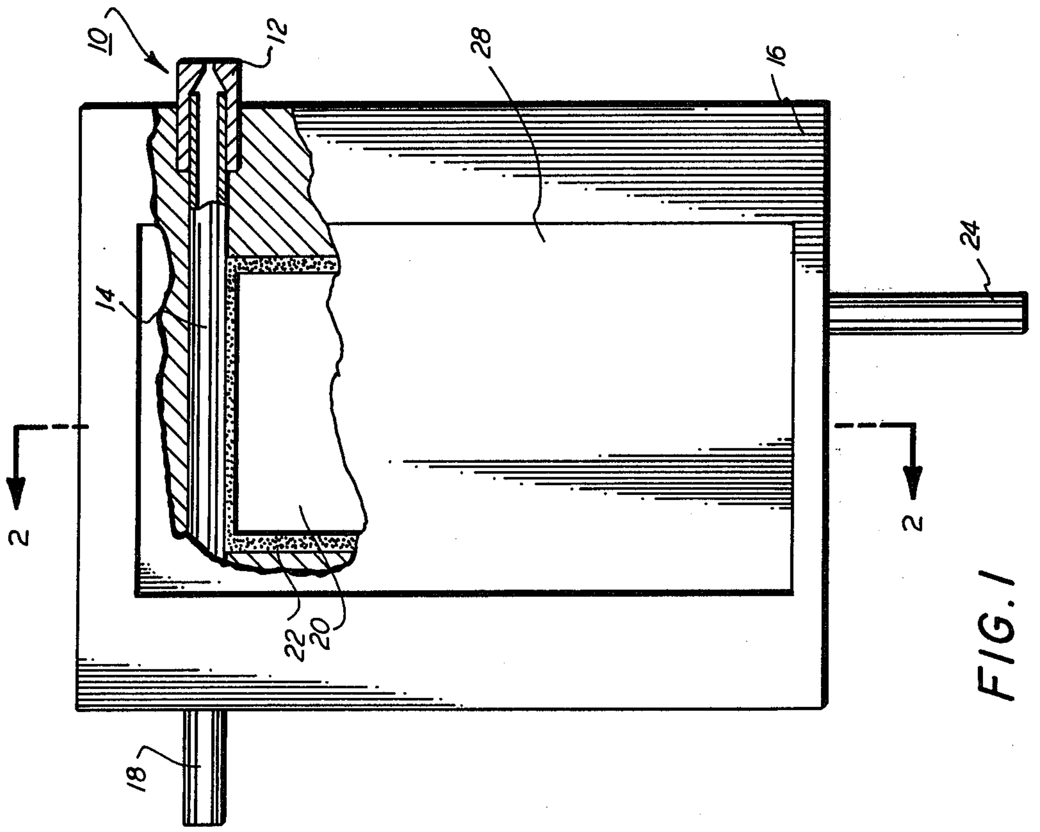
FIG. 1 is an elevational view, partially in section, depicting an ink jet module of the present inventions.

For a general understanding of the ink jet printing machine incorporating the features of the present invention therein, reference is made to the drawings. In the drawings, like reference numerals have been used throughout to designate identical elements. FIG. 1 schematically depicts an ink jet module incorporating the components of the present invention therein. Although the present invention is particularly well adapted for use in ink jet printing, it will become evident from the following discussion that it is equally well suited for use in a wide variety of devices and is not necessarily limited in its application to the particular embodiment shown herein.

Referring now to FIG. 1, there is shown an ink jet module arranged to eject droplets of writing fluid or ink therefrom. The ink jet module is indicated generally by the reference numeral 10. Ink jet module 10 includes a nozzle 12 in communication with tube 14 in housing 16. An inlet portion 18 of tube 14 is connected to a supply of writng ink. A piezoelectric transducer 20 is positioned closely adjacent tube 14. Piezoelectric transducer 20 is encapsulated in an elastomeric material such as urethane 22. An electric voltage pulse generator (not shown) is connected to piezoelectric transducer 20 by electrical lead wire 24. Rectangular recessed portions 28 are formed in housing 16 to define slots between adjacent ink jet modules. These slots are preferably filled with air so as to reduce cross coupling between adjacent ink jet modules. Alternatively, these slots may be filled with a liquid. All of the recessed portions are preferably about the same volume. In this manner, each recessed portion is one half of the volume of the slot separating adjacent ink jet modules. Excitation of piezoelectric transducer 20 causes tube 14 to be compressed or restricted in size. In this way, a droplet of ink or writing fluid is ejected from nozzle 12. Preferably, piezoelectric transducer 20 is made from piezoceramic PZT-5, available from Vernitron Piezoelectric Division, Bedford, Ohio.

Figure 2:
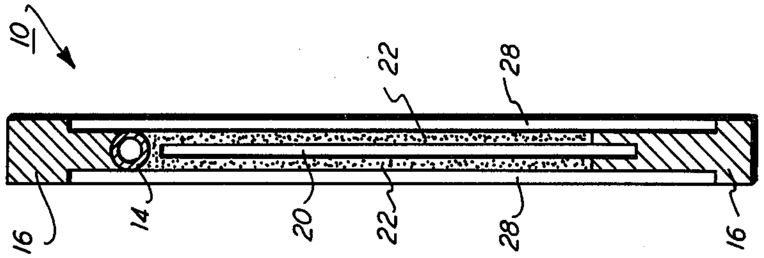
FIG. 2 is a sectional elevational view taken in the direction of the arrows 2—2 of FIG. 1.

Turning now to FIG. 2, there is shown ink jet module 10 in section taken in the direction of arrows 2—2 of FIG. 1. As shown thereat, housing 16 is preferably formed by casting a plastic material, such as urethane. Piezoelectric transducer 20 is at least partially secured to housing 16. Nozzle 12 is also secured to housing 16. A pair of opposed, spaced rectangular recessed portions are formed in housing 16.

Figure 3:
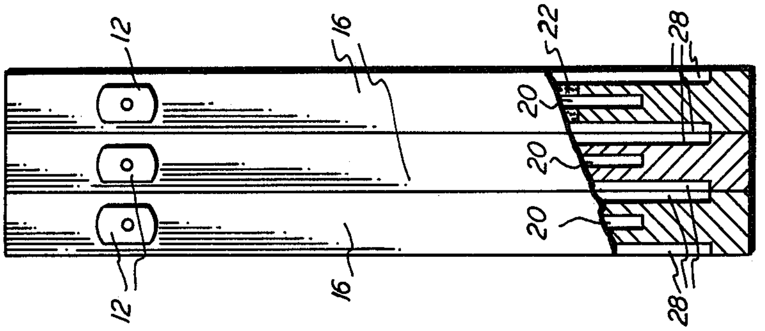
FIG. 3 is an elevational view, partially in section, showing an array of ink jet modules.

As shown in FIG. 3, a linear array of ink jet modules are formed by placing each ink jet module of FIG. 2 adjacent to one another. As depicted thereat, recessed portions 28 of adjacent ink jet modules are aligned with one another to define slots therebetween. In this way, adjacent ink jet assemblies are isolated from one another. This is achieved by the air spaces in the slots between adjacent modules. The air between adjacent ink jet modules acts as a damping medium to insure that surface to surface contact, between adjacent ink jet modules, is minimized. Hence, when one of the ink jet modules is actuated by energizing a selected piezoelectric transducer, adjacent ink jet modules remain deactivated, i.e. there is no cross coupling between the adjacent ink jet modules or interaction therebetween due to the isolation provided by the slots therebetween. Preferably, these slots are air filled, but one skilled in the art will appreciate that the slots may be filled with any suitable fluid or visco-elastic damping medium.

In recapitulation, it is clear that the ink jet printing machine of the present invention includes a linear array of nozzles with adjacent nozzles being isolated from one another to prevent interaction therebetween when a selected nozzle is energized. Isolation of adjacent nozzles is achieved by interposing a damping medium therebetween. This damping medium is disposed in slots between adjacent nozzles and tends to prevent cross coupling. In this way, interaction is minimized and only the selected nozzle will be energized rather than both the selected nozzle and adjacent nozzles.

It is, therefore, evident that there has been provided in accordance with the present invention an ink jet printing machine in which adjacent nozzles are isolated from one another preventing cross coupling therebetween. This machine fully satisfies the advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications and variations as fall within the spirit and broad scope of the appended claims.

What is claimed is:

1. An ink jet printing machine comprising:

an array of nozzles;

a plurality of channels for coupling a supply of writing fluid to each nozzle of said array;

a plurality of transducers, each of said transducers positioned closely adjacent an associated channel, so that activation of the transducer that is adjacent its associated channel ejects a droplet of writing fluid from the nozzle coupled to that channel;

one each of the nozzles, channels and transducers being supported in a housing of their own which, when abutted against other similar housings, forms said array of nozzles;

means for activating said transducers in the housings; and each said housing having recessed portions which define slots which are spaced between adjacent transducers and extending between adjacent channels to isolate each transducer and associated channel from the transducers and their associated channels in the other housings with which said housing abuts.

2. The ink jet printing machine of claim 1 where said slots are filled with air.

3. The ink jet printing machine of claim 1 where said slots are filled with a liquid.

4. The ink jet printing machine of claim 1 wherein said channels are compressible tubes.

5. The ink jet printing machine according to claim 1, wherein, at least one of the recessed portions of adjacent housings are aligned with one another so that the combined recessed portions of both adjacent housings define the slot between the transducers and their associated channels.

6. The ink jet printing machine according to claim 5, wherein each of the recessed portions of said housings have substantially equal volumes.

* * * * *